United States Patent Office 2,943,085
Patented June 28, 1960

2,943,085
COMPLEX METAL COMPOUNDS OF MONOAZO TRIAZINE DYESTUFFS

Fritz Oesterlein, Basel, Switzerland, assignor to Ciba Limited, Basel, Switzerland No Drawing. Filed Oct. 6, 1958, Ser. No. 765,285

Claims priority, application Switzerland Oct. 10, 1957

12 Claims. (Cl. 260—146)

This invention provides new complex metal compounds of monoazo-dyestuffs of the formula (1) 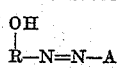

in which R—OH represents the radical of a hydroxynaphthalene sulfonic acid which is bound to the azo linkage in a position vicinal to the hydroxyl group and contains a nitro group, and A represents the radical of an aminocompound which contains a group imparting solubility in water and is bound to the azo linkage in a position vicinal to a hydroxyl group and of which the amino group is bound to a halogenated 1:3:5-triazine radical. The invention advantageously provides copper or nickel compounds of the above kind, and especially 1:2-complex chromium or cobalt compounds thereof, and especially such complex metal compounds of monoazo-dyestuffs of the formula (2) 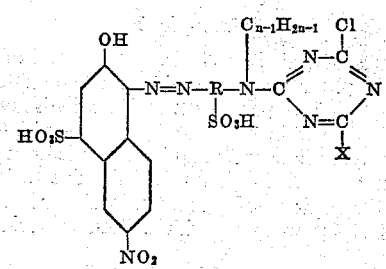

in which $n$ is a whole number not greater than 4, R represents a naphthalene radical bound to the azo linkage in a position vicinal to a hydroxyl group, and X represents a chlorine atom or advantageously an amino group which may be substituted.

The new metalliferous monoazo-dyestuffs can be obtained by metallizing the corresponding metal-free dyestuffs or especially advantageously by reacting a triazine of the formula (3) 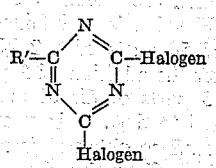

in which R' represents a free amino group or an organic radical or a halogen atom, on the one hand, with a complex heavy metal compound of a monoazo-dyestuff of the formula (4) 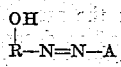

in which R—OH represents the radical of a hydroxynaphthalene sulfonic acid bound to the azo linkage in a position vicinal to the hydroxyl group and containing a nitro group, and A represents the radical of an amino-compound which contains a sulfonic acid group and is bound to the azo linkage in a position vicinal to a hydroxyl group, and of which the amino group is at most secondary, and, when a trihalogen triazine is used as starting material, if desired, reacting the product, on the other hand, with a mercapto compound, a hydroxyl compound, ammonia or an at most secondary monamine.

When a dihalogen triazine of the Formula 3 is used, it advantageously contains as the substituent R' the radical of an amine or a free amino group. These dihalogen triazines can be prepared by methods in themselves known from a cyanuric halide such as cyanuric bromide or cyanuric chloride, by reacting one mol of cyanuric halide with one mol of ammonia or of a reactive organic hydroxyl compound, for example, a phenol or an alcohol, or with one mol of an at most secondary monamine. As such amines there may be used, for example, methylamine, ethylamine, isopropylamine, methoxyethylamine, methoxypropylamine, cyclohexylamine, dimethylamine, diethylamine or N-methylphenylamine, chlorethylamine, ethanolamines, aminocarbonic acid esters, aminoacetic acid ethyl ester, aniline, aminoethane sulfonic acid, N-methylaminoethane sulfonic acid, aminosalicylic acid, ortho-, meta- or para-aminobenzoic acid, aminobenzoic acid sulfonic acids, ortho-, meta- or para-aminobenzene sulfonic acid or 1-aminobenzene-2:5-disulfonic acid, and also aminonaphthalene mono-, di- or tri-sulfonic acids.

The metalliferous dyestuffs to be condensed with the cyanuric halide or a primary cyanuric halide condensation product of the Formula 3 can be made by methods in themselves known, for example, by metallizing monoazo-dyestuffs of the formula (5) 

in which R—OH represents the radical of a hydroxynaphthalene sulfonic acid which is bound to the azo linkage in a position vicinal to the hydroxyl group and contains a nitro group, and A represents the radical of an aminocompound which contains a sulfonic acid group and is bound to the azo linkage in a position vicinal to a hydroxyl group and of which the amino group is capable of being acylated. For making metallizable monoazo-dyestuffs of the Formula 5 a diazotized nitro-aminonaphthol sulfonic acid, especially diazotized 6-nitro-1-amino-2-hydroxynaphthalene-4-sulfonic acid, may be coupled in an alkaline medium, for example, a medium containing sodium hydroxide, calcium hydroxide, magnesium hydroxide or potassium hydroxide, with a coupling component which is capable of coupling in a position vicinal to a hydroxyl group or enolizable keto group, and contains an acylatable amino group or a substituent, for example, an acylamino group convertible into an acylatable amino group after production of the dyestuff. As such coupling components there may be mentioned, for example, 1 - acetoacetylamino-3-aminobenzene-4-sulfonic acid, 1-(3'- or 4'-aminophenyl)-5-pyrazolone-3-carboxylic acid, and especially aminonaphthol sulfonic acids such as 2-amino-6-hydroxynaphthalene-8-sulfonic acid, 2-alkylamino-5-hydroxynaphthalene-7-sulfonic acids, for example, 2 - methylamino - 5-hydroxynaphthalene-7-sulfonic acid, or 2 - acetylamino - 5-hydroxynaphthalene-7-sulfonic acid, 2-amino-5'-hydroxynaphthalene-7-sulfonic acid, 2-amino-5-hydroxynaphthalene-7:1-disulfonic acid, 2-(3'- or 4' - aminobenzoylamino) - hydroxynaphthalene-7-sulfonic acid, 2 - (4'-acetylaminophenylamino)-5-hydroxynaphthalene-7-sulfonic acid, 2-(4'-aminophenylamino)-5-hydroxynaphthalene-3':7 - disulfonic acid, 2 - (3' - aminophenylamino)-5-hydroxynaphthalene-4':7-disulfonic acid or 1-amino-8-hydroxynaphthalene-3:6- or 4:6-disulfonic acid.

The conversion of the dyestuffs obtained from these components into the complex heavy metal compounds used as starting materials in the process of this invention can be carried out while the dyestuffs are present in the coupling mixture in which they were formed.

As agents yielding metal there may be mentioned, more especially, agents yielding cobalt, chromium, copper or nickel.

The metal compounds may contain for each atom of metal in complex union one or two mono-dyestuff molecules. When an agent yielding copper or nickle is used there are formed, for example, preferably compounds which contain one atom of metal in complex union with one monoazo-dyestuff molecule, whereas when an agent yielding chromium or especially one yielding cobalt is used the 1:2-complexes can easily be obtained and are especially valuable.

As agents yielding metal there may be used, for example, salts which contain the said metals as the cation, for example, chromium sulfates, cobalt acetate, cobalt sulfate, copper sulfate or copper acetate. In some cases it is of advantage to use complex metal compounds, for example, in the form of metal-ammine complexes, such as copper tetrammine sulfate obtained from copper sulfate and ammonia, pyridine or monoethanolamine, or in the form of compounds which contain one of the aforesaid metals bound in complex union in the anion, for example, complex chromium compounds of organic hydroxy-carboxylic acids such as salicylic acid, or complex cobalt or copper compounds of alkali salts of aliphatic amino-carboxylic acids or hydroxy-carboxylic acids, such as glycine, lactic acid or above all tartaric acid, such as sodium copper tartrate.

The treatment with the agents yielding metal may be carried out by a method in itself known, for example, at room temperature and advantageously by heating at a temperature within the range of 50° C. to 120° C. under atmospheric pressure, for example, under reflux or, if desired, under superatmospheric pressure, the pH-value depending on the nature of the metallization process used. For example, an acid medium in the case of copper sulfate and an alkaline medium in the case of copper tetrammine sulfate. If desired, the metallization may be carried out in the presence of a solvent, for example alcohol, dimethyl-formamide etc.

The starting materials containing heavy metal can also be prepared by the metallization and simultaneous or subsequent hydrolysis of ortho:ortho'-dihydroxy-monoazo-dyestuffs of the kind defined above which contain acylamino groups.

The condensation of the complex metal compounds of monoazo-dyestuffs of the Formula 4 or 5 with the halogen-triazines of the Formula 3 is advantageously carried out in the presence of an agent capable of binding acid, such as sodium acetate, or sodium hydroxide or carbonate, and under conditions such that at least one exchangeable halogen atom remains in the final product, that is to say, for example, in the presence of an organic solvent or at a relatively low temperature in an aqueous medium.

The dyestuffs of this invention are new and are useful for dyeing a very wide variety of fibrous materials, such as cellulose, regenerated cellulose or viscose, linen and especially cotton. They are suitable for dyeing by the so-called direct dyeing method from a long liquor in an aqueous alkaline bath, which may contain a high concentration of a salt, and especially by the printing method or pad dyeing method, in which the dyestuff is applied to the material to be dyed and subsequently fixed thereon by means of an acid-binding agent and, if desired, by the action of heat.

The dyeings produced with the dyestuffs of this invention on cellulosic fibers are generally distinguished by their good fastness to light and above all their excellent fastness to washing. The resistance of the dyeings on cotton to anti-creasing dressings is remarkable. The dyestuffs are also suitable for dyeing nitrogenous textile materials, such as silk, superpolyamide fibers, wool or the like, from weakly acid to neutral baths, if desired, in the presence of the usual dyeing assistants.

The following examples illustrate the invention, the parts and percentages being by weight:

Example 1

29.5 parts of the diazo-compound of nitrated 1-amino-2-hydroxynaphthalene-4-sulfonic acid are added as the sodium salt to 23.9 parts of 2-amino-5-hydroxynaphthalene-7-sulfonic acid in 100 parts by volume of a 2 N-solution of sodium hydroxide, and coupling is carried out at 15–20° C. When the coupling is finished the dyestuff is precipitated by the addition of sodium chloride, then filtered off, and purified by washing with sodium chloride solution of 5% strength.

53.4 parts of the dyestuff so obtained are dissolved in 1500 parts of water and 50 parts of sodium acetate are added. After the addition of 25 parts of copper sulfate (crystalline) the whole is heated for one hour at 60–80° C. The copper complex is salted out and filtered off. The paste so obtained is dissolved in 2000 parts of water and the solution is rendered weakly alkaline. At 5–10° C. there are added 18.5 parts of cyanuric chloride dissolved in 100 parts of acetone, and the reaction mixture is neutralized by the addition of a dilute solution of sodium carbonate. When the condensation is finished, the dichlorotriazine dyestuff is precipitated by the addition of sodium chloride, filtered off, mixed with 5 parts of monosodium phosphate and 5 parts of disodium phosphate, and the mixture is dried in vacuo at 40° C. The dyestuff so obtained dyes cotton from alkaline baths containing a salt, violet tints which are fast to washing.

By adding to the resulting solution of the dichlorotriazine compound a neutral solution of 17.3 parts of 1-aminobenzene-3-sulfonic acid, and maintaining the reaction mixture weakly alkaline for 3 hours at 30–40° C., there is obtained a monochlorotriazine dyestuff which dyes cotton violet tints that are fast to washing and light.

Example 2

29.5 parts of the nitrated diazo-compound of 1-amino-2-hydroxynaphthalene-4-sulfonic acid are added as the sodium salt to 23.9 parts of 2-amino-5-hydroxynaphthalene-7-sulfonic acid in 100 parts by volume of 2 N-solution of sodium hydroxide, and coupling is carried out at 15–20° C. When the coupling is finished the dyestuff is precipitated by the addition of sodium chloride, then filtered off and purified by washing with sodium chloride of 5% strength.

53.4 parts of the resulting dyestuff are dissolved in 300 parts of water at 80° C. and 120 parts of a solution of sodium chromosalicylate having a chromium content of 2.6% are added. After boiling the mixture for 4 hours under reflux the chroming is complete.

In order to prepare the dichloro-triazine derivative, the resulting solution of the 1:2-chromium compound is adjusted to a pH value of 7 with dilute hydrochloric acid. 18.5 parts of cyanuric chloride, dissolved in a small amount of acetone, are added at 0–5° C. while stirring well, and the pH value is maintained at 7 by the dropwise addition of 50 parts of a 2 N-solution of sodium hydroxide. After the addition of 5 parts of monosodium phosphate and 5 parts of disodium phosphate the solution is evaporated to dryness in vacuo at 30–40° C.

The new dyestuff so obtained is a grey-black powder, and dyes cellulose fibers by the process described in Example 8 greenish grey tints of good fastness to washing and light.

Example 3

In order to prepare the monochlorotriazine derivative of the dyestuff obtained as described in Example 2, the solution of the 2:1-chromium compound obtained as described in the first two paragraphs of Example 2 is adjusted to a pH-value of 7 with dilute hydrochloric acid. 18.5 parts of cyanuric chloride dissolved in a small amount of acetone are added at 0–5° C. while stirring well, and the pH value is maintained at 7 by the dropwise addition of 50 parts of a 2 N-solution of sodium hydroxide.

125 parts of a 2 N-solution of ammonia are added to the reaction mixture so obtained, and the whole is stirred for 3 hours at 35–40° C. By evaporating the mixture to dryness in vacuo at 50–50° C., the new dyestuff is obtained as a grey-black powder which dyes cellulose fibers by the method described in Example 8 greenish grey tints of good fastness to washing and light.

Example 4

53.4 parts of the dyestuff obtained as described in the first paragraph of Example 2 are dissolved at 70° C. in 300 parts of water with the addition of 100 parts of a 2 N-solution of sodium hydroxide, and 100 parts of a cobalt sulfate solution having a cobalt content of 3.25% are added. After stirring the whole for ½ hour at 70–80° C. metallization is complete.

The corresponding dichlorotriazine compound can be obtained by the method described in the third paragraph of Example 2.

In order to prepare the amino-chlorotriazine compound the solution of the dichloro-triazine compound is mixed with 120 parts by volume of a 2 N-solution of ammonia, and the whole is heated for 2 hours at 40° C. The dyestuff is isolated by evaporating the solution in vacuo. The dyestuff dyes cellulose fibers by the method described in Example 8 grey-brown tints of good fastness to washing and light.

Example 5

The dichlorotriazine compound prepared in known manner from 17.3 parts of 1-aminobenzene-3-sulfonic acid and 18.5 parts of cyanuric chloride are added to the neutral solution of the 1:2-complex chromium compound obtained as described in the first paragraph of Example 2, the whole is heated for 3 hours at 30–40° C., and care is taken by the gradual addition of a dilute caustic soda solution that the reaction of the mixture is maintained weakly acid to neutral. When the condensation is finished the solution obtained is evaporated to dryness in vacuo. The dyestuff dyes cotton green-grey tints.

Further dyestuffs can be obtained in the manner described in Examples 1–5 by converting the monoazo-dyestuffs, obtained from the nitrated diazo-compound of 1-amino-2-hydroxy-naphthalene-4-sulfonic acid and the coupling components given in column I of the following table, into their complex metal compounds, the metals being given in column II, condensing the latter compounds with cyanuric chloride, and reacting the dichlorotriazine derivatives so formed with the amines given in column III. The condensation may be carried out in the reverse order of succession. The tints produced on cotton with these dyestuffs are given in column IV.

| I<br>Coupling Components | II<br>Metal | III<br>Amines | IV<br>Tints |
|---|---|---|---|
| 2-Amino-5-hydroxynaphthalene-7-sulfonic acid. | Cr | 2-Aminoethanol | greenish grey. |
| Do | Cr | Diethanolamine | Do. |
| Do | Cr | Methylamine | Do. |
| Do | Cr | Ethylamine | Do. |
| Do | Cr | Morpholine | Do. |
| Do | Cr | 3-Methoxypropylamine. | Do. |
| Do | Cr | Isopropanolamine | Do. |
| Do | Cr | 1-Aminobenzene-2-sulfonic acid. | Do. |
| Do | Co | 2-Aminoethanol | grey-violet. |
| Do | Co | Morpholine | violet-grey. |
| Do | Co | 1-Aminobenzene-2-carboxylic acid. | Do. |
| Do | Co | 2-Aminonaphthalene-4:8-disulfonic acid. | grey-violet. |
| Do | Co | 2-Aminonaphthalene-6-sulfonic acid. | Do. |
| Do | Co | Aniline | Do. |
| Do | Cu | Ammonia | violet. |
| Do | Cu | 1-Aminobenzene-2-sulfonic acid. | Do. |
| Do | Ni | 1-Aminobenzene-2,5-disulfonic acid. | Do. |

| I<br>Coupling Components | II<br>Metal | III<br>Amines | IV<br>Tints |
|---|---|---|---|
| 2-Methylamino-5-hydroxynaphthalene-7-sulfonic acid. | Cr | Ammonia | greenish grey. |
| Do | Cr | 1-Aminobenzene-3-sulfonic acid. | Do. |
| Do | Co | Ammonia | brownish violet-grey. |
| 2-Methylamino-5-hydroxynaphthalene-7-sulfonic acid. | Cu | 1-Aminobenzene-4-sulfonic acid. | violet. |
| Do | Ni | do | Do. |
| 2-Ethylamino-5-hydroxynaphthalene-7-sulfonic acid. | Cr | Ammonia | greenish grey. |
| 1-Amino-8-hydroxynaphthalene-3:6-disulfonic acid. | Cr | do | green-grey. |
| Do | Co | do | blackish grey. |
| Do | Cu | do | blue. |
| 1-(3'-Aminophenyl)-3-carboxy-5-pyrazolone. | Cr | do | bordeaux. |
| Do | Co | do | red-brown. |
| 2-(4'-Aminophenyl)-5-hydroxynaphthalene-7:3'-disulfonic acid. | Cr | do | greenish blue. |
| 2-Amino-5-hydroxynaphthalene-1:7-sulfonic acid. | Cr | do | greenish blue grey. |
| 2-Amino-5-hydroxynaphthalene-7-sulfonic acid. | Cr | β-Aminoethane-sulfonic acid. | Do. |
| Do | Cr | Amino acetic acid | Do. |
| Do | Cr | 4-Amino-1-hydroxybenzene-2-carboxylic acid. | Do. |
| Do | Cr | 1-Amino-4-methylbenzene-2-sulfonic acid. | Do. |
| Do | Cr | Cyclohexylamine | Do. |

Example 6

A solution of 18 parts of 2-methoxy-4:6-dichloro-1:3:5-triazine in acetone is run into a neutral solution, obtained as described in the first two paragraphs of Example 1, of the 1:2-complex chromium compound of 53.4 parts of the monoazo-dyestuff of the formula

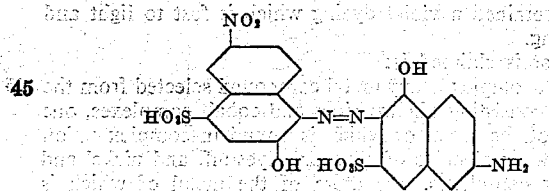

and the whole is heated to 40° C. There are then added 10 parts of sodium bicarbonate and the whole is heated for 4 hours at 40° C. By working up in the usual manner, there is obtained a dyestuff which dyes cotton green-grey tints.

A dyestuff having similar properties is obtained by using, instead of 2-methoxy-4:6-di-chlorotriazine, the corresponding quantity of 2-phenoxy-4:6-dichloro-1:3:5-triazine or the corresponding quantity of 2-phenoxy-4:6-dibromo-1:3:5-triazine or the corresponding quantity of 2-phenylthio-4:6-dichloro-1:3:5-triazine.

The corresponding cobalt derivative dyes cotton violet-grey tints.

Example 7

0.1 mol of the complex chromium compound of the dyestuff of the formula

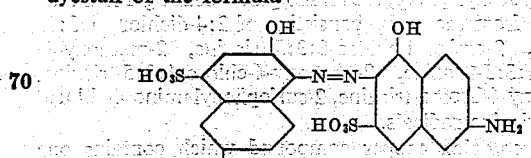

which contains one atomic proportion of chromium bound in complex union per molecular proportion of dyestuff, and 0.1 mol of the metal-free dyestuff of the formula

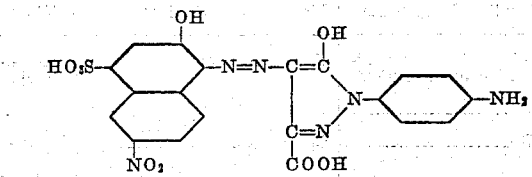

are dissolved in 2000 parts of water. The whole is heated for one hour at 80–90° C. and the reaction mixture is maintained weakly alkaline by the addition of sodium carbonate. A solution of the 1:2-chromium mixed complex compound is formed, and the solution is cooled, neutralized, and the complex compound is condensed at 0–5° C. with 38 parts of cyanuric chloride. The resulting solution is then mixed with 240 parts of a 2 N-solution of ammonia and heated for 2 hours at 40° C. The aminochlorotriazine dyestuff so formed is obtained in solid form by evaporating the solution in vacuo. It dyes cotton brown-black tints.

*Example 8*

2 parts of the dyestuff obtained as described in the first two paragraphs of Example 1 are dissolved in 100 parts of water. A fabric of regenerated cellulose stable fibers is impregnated with the solution so obtained in such manner that it takes up 75% of its weight of the solution, and the impregnated fabric is then dried.

The fabric is then impregnated with a solution, at 20° C., containing per liter, 10 grams of sodium hydroxide and 300 grams of sodium chloride, the fabric is squeezed to a weight increase of 75%, the dyeing is steamed for 60 minutes at 100–101° C., rinsed, soaped for ¼ hour in a boiling solution of 0.3% strength of a non-ionic detergent, rinsed and dried.

There is obtained a violet dyeing which is fast to washing and light.

By using 2 parts of the dyestuff obtained as described in the first three paragraphs of Example 1, there is likewise obtained a violet dyeing which is fast to light and washing.

What is claimed is:

1. A complex heavy metal compound selected from the group consisting of chromium and cobalt complexes, one atom of the metal of which is bound in complex union with two molecules of monoazo-dyestuff, and nickel and copper complexes, one atom of the metal of which is bound in complex union with one molecule of monoazo dyestuff, the said monoazo dyestuff corresponding to the formula

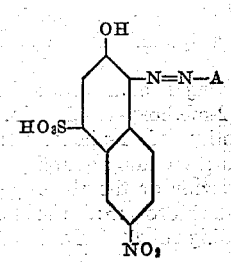

in which A represents the radical of an aminonaphthol sulfonic acid bound to the azo linkage in a position vicinal to the hydroxyl group, the amino group bearing a member selected from the group consisting of 2:4-dichloro-1:3:5-triazine, 2-amino-4-chloro-1:3:5-triazine, 2-methoxy-4-chloro-1:3:5-triazine, 2-phenoxy-4-chloro-1:3:5-triazine, 2-phenoxy-4-bromo-triazine, 2-sulfophenylamino-4-chloro-1:3:5-triazine radicals.

2. A complex copper compound which contains one atom of copper bound in complex union with one molecule of a monoazo dyestuff of the formula

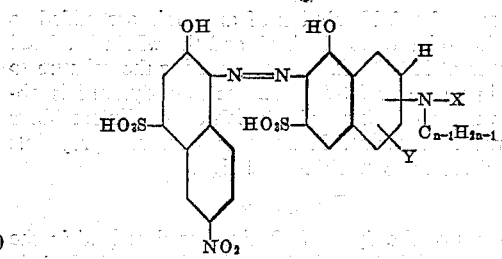

wherein Y represents a member selected from the group consisting of a hydrogen atom and a sulfonic acid group, $n$ represents a whole positive number up to 4, and X represents a 2-amino-4-chloro-1:3:5-triazine radical bound to the nitrogen atom by its 6-position.

3. The complex copper compound which contains one atom of copper bound in complex union with one molecule of the monoazo dyestuff of the formula

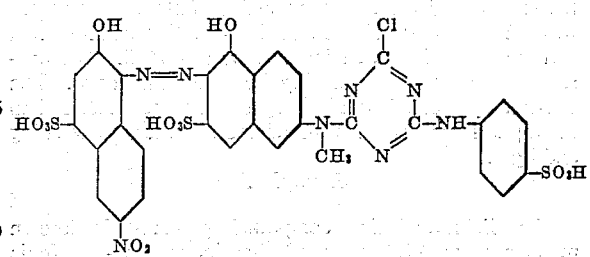

4. A complex chromium compound which contains one atom of chromium bound in complex union with substantially two molecules of a monoazo dyestuff of the formula

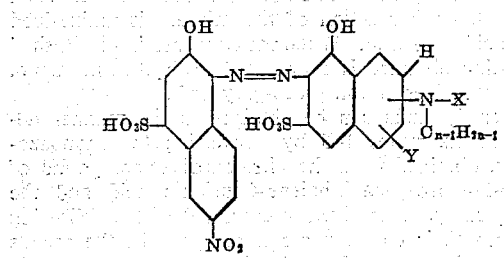

wherein Y represents a member selected from the group consisting of a hydrogen atom and a sulfonic acid group, $n$ represents a whole positive number up to 4, and X represents a 2-amino-4-chloro-1:3:5-triazine radical bound to the nitrogen atom by its 6-position.

5. A complex cobalt compound which contains one atom of cobalt bound in complex union with substantially two molecules of a monoazo dyestuff of the formula

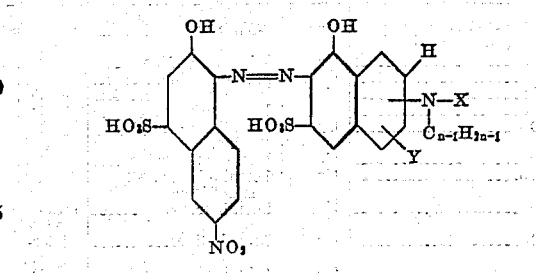

wherein Y represents a member selected from the group consisting of a hydrogen atom and a sulfonic acid group, $n$ represents a whole positive number up to 4, and X represents a 2-amino-4-chloro-1:3:5-triazine radical bound to the nitrogen atom by its 6-position.

6. A complex chromium compound which contains one atom of chromium bound in complex union with substantially two molecules of a monoazo dyestuff of the formula

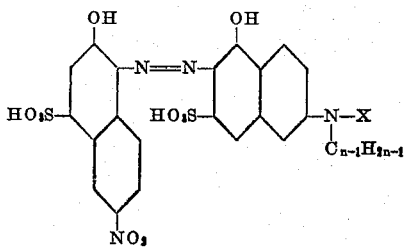

wherein $n$ represents a whole positive number up to 4 and X represents the 2:4-dichloro-1:3:5-triazine substituent.

7. A complex cobalt compound which contains one atom of cobalt bound in complex union with substantially two molecules of a monoazo dyestuff of the formula

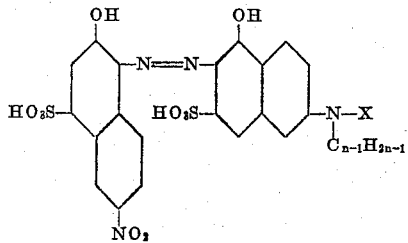

wherein $n$ represents a whole positive number up to 4 and X represents the 2:4-dichloro-1:3:5-triazine radical.

8. A complex chromium compound which contains one atom of chromium bound in complex union with substantially two molecules of a monoazo dyestuff of the formula

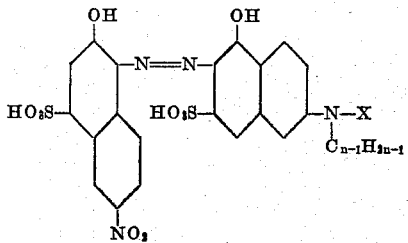

wherein $n$ represents a whole positive number up to 4 and X represents a 2-amino-4-chloro-1:3:5-triazine radical bound to the nitrogen atom by its 6-position.

9. A complex cobalt compound which contains one atom of cobalt bound in complex union with substantially two molecules of a monoazo dyestuff of the formula

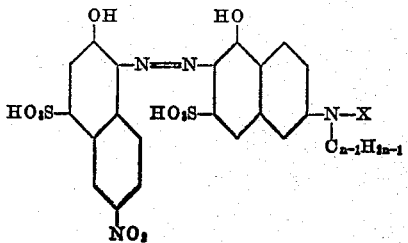

wherein $n$ represents a whole positive number up to 4 and X represents a 2-amino-4-chloro-1:3:5-triazine radical bound to the nitrogen atom by its 6-position.

10. The complex chromium compound which contains one atom of chromium bound in complex union with substantially two molecules of the monoazo dyestuff of the formula

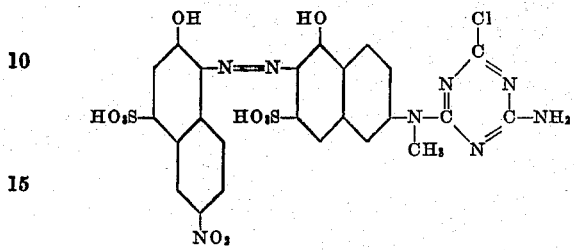

11. The complex cobalt compound which contains one atom of cobalt bound in complex union with substantially two molecules of the monoazo dyestuff of the formula

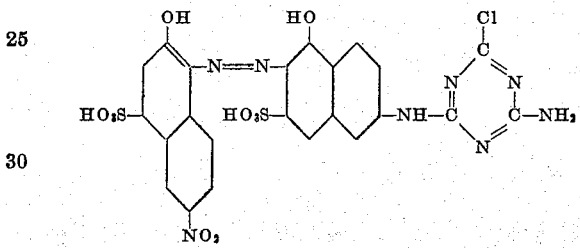

12. The complex chromium compound which contains one atom of chromium bound in complex union with substantially two molecules of the monoazo dyestuff of the formula

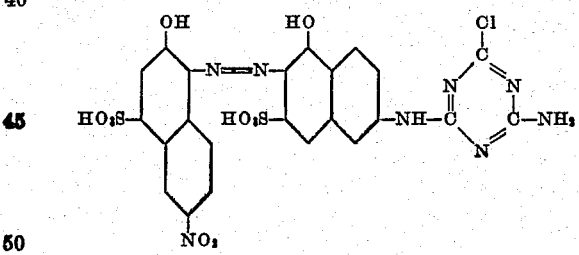

References Cited in the file of this patent
UNITED STATES PATENTS

| | | |
|---|---|---|
| 2,270,478 | Schmid | Jan. 20, 1942 |
| 2,273,115 | Kracker et al. | Feb. 17, 1942 |